(12) United States Patent
Bushman

(10) Patent No.: US 12,467,214 B1
(45) Date of Patent: Nov. 11, 2025

(54) DUAL HANDLE SNOW SHOVEL DEVICE

(71) Applicant: Rhody Bushman, Appleton, WI (US)

(72) Inventor: Rhody Bushman, Appleton, WI (US)

( * ) Notice: Subject to any disclaimer, the term of this patent is extended or adjusted under 35 U.S.C. 154(b) by 0 days.

(21) Appl. No.: 19/051,889

(22) Filed: Feb. 12, 2025

(51) Int. Cl.
  *A01B 1/22* (2006.01)
  *B25G 1/06* (2006.01)
  *E01H 5/02* (2006.01)

(52) U.S. Cl.
  CPC ...................... *E01H 5/02* (2013.01)

(58) Field of Classification Search
  CPC ..................... E01H 5/02; B62B 1/12
  USPC ........................................... 294/54.5
  See application file for complete search history.

(56) References Cited

U.S. PATENT DOCUMENTS

| | | | | |
|---|---|---|---|---|
| 2,921,798 A * | 1/1960 | Cislak | ...................... | B62B 1/12 |
| | | | | 280/47.27 |
| 3,136,574 A * | 6/1964 | Pasquale | .................. | E01H 5/02 |
| | | | | 182/194 |
| 3,833,263 A * | 9/1974 | Jackson | .................... | B60P 1/18 |
| | | | | 298/17.5 |
| 4,125,951 A * | 11/1978 | Huerth | ...................... | E01H 5/02 |
| | | | | 37/434 |
| 5,048,883 A | 9/1991 | Waluk | | |
| 5,511,327 A * | 4/1996 | Jurkowski | ................. | E01H 5/02 |
| | | | | 37/285 |
| 6,592,160 B1 * | 7/2003 | Nicolay | .................... | B25G 1/00 |
| | | | | 294/58 |
| 8,616,597 B2 * | 12/2013 | Guerra | ...................... | B25G 1/00 |
| | | | | 294/58 |
| 9,670,632 B2 | 6/2017 | Behan | | |
| D823,656 S | 7/2018 | Ziamandanis | | |
| 10,125,461 B1 | 11/2018 | Alarie | | |
| 11,542,674 B2 * | 1/2023 | Lyons | ....................... | E01H 5/02 |
| 11,713,550 B1 | 8/2023 | Watson | | |
| 2013/0199061 A1 * | 8/2013 | Klein | ........................ | E01H 5/02 |
| | | | | 37/285 |
| 2020/0318302 A1 | 10/2020 | Rueda | | |
| 2021/0131050 A1 | 5/2021 | Payette | | |
| 2023/0257949 A1 | 8/2023 | Shaerman | | |
| 2023/0332363 A1 | 10/2023 | Sanchez | | |

FOREIGN PATENT DOCUMENTS

WO    WO2020176453    9/2020

* cited by examiner

*Primary Examiner* — Paul T Chin

(57) ABSTRACT

A snow shovel device for shoveling snow includes a shovel blade that is widened along a lateral axis to shovel snow from a support surface. A first handle is attached to and extends upwardly from the shovel blade and the first handle can be gripped by a user thereby enabling the user to push the shovel blade along the support surface to push the snow. A second handle is removably attached to the first handle and the second handle can be gripped by the user. The second handle is positioned closer to the shovel blade than the first handle. In this way the second handle enables the user to throw the snow with the shovel blade without requiring the user to bend over.

8 Claims, 7 Drawing Sheets

DUAL HANDLE SNOW SHOVEL DEVICE

(g) BACKGROUND OF THE INVENTION

(1) Field of the Invention

The disclosure relates to snow shovel devices and more particularly pertains to a new snow shovel device for shoveling snow. The device includes a shovel blade and a first handle that is attached to an extends upwardly from the shovel blade. The device includes a second handle that is removably attachable to the first handle thereby enabling the second handle to be positioned closer the shovel blade than the first handle. In this way a user can grip the first handle and the second handle to enabling the user to push snow and to throw the snow without requiring the user to bend over.

(2) Description of Related Art Including Information Disclosed Under 37 CFR 1.97 and 1.98

The prior art relates to snow shovel devices including: a shovel device that includes a pair of handles and a pair of grips each attached to a respective handle to enable a user to grip each of the grips; a variety of shovel devices that each at least includes a handle and a pair of grips each attached to the handle which can be gripped by a user; and a shovel device that includes a pair of U-shaped handles and a pair of grips attached to a respective one of the U-shaped handles and a shovel blade comprised of a series of interlocked sections. In no instance does the prior art disclose a snow shovel device that includes a first handle that is comprised of perpendicularly oriented members such that the first handle has a U-shape, which is attached to a shovel blade, and a second handle that is comprised of perpendicularly oriented members which is removably attachable to the first handle to enable the user to throw snow without bending over.

(h) BRIEF SUMMARY OF THE INVENTION

An embodiment of the disclosure meets the needs presented above by generally comprising a shovel blade that is widened along a lateral axis to shovel snow from a support surface. A first handle is attached to and extends upwardly from the shovel blade and the first handle can be gripped by a user thereby enabling the user to push the shovel blade along the support surface to push the snow. A second handle is removably attached to the first handle and the second handle can be gripped by the user. The second handle is positioned closer to the shovel blade than the first handle. In this way the second handle enables the user to throw the snow with the shovel blade without requiring the user to bend over.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
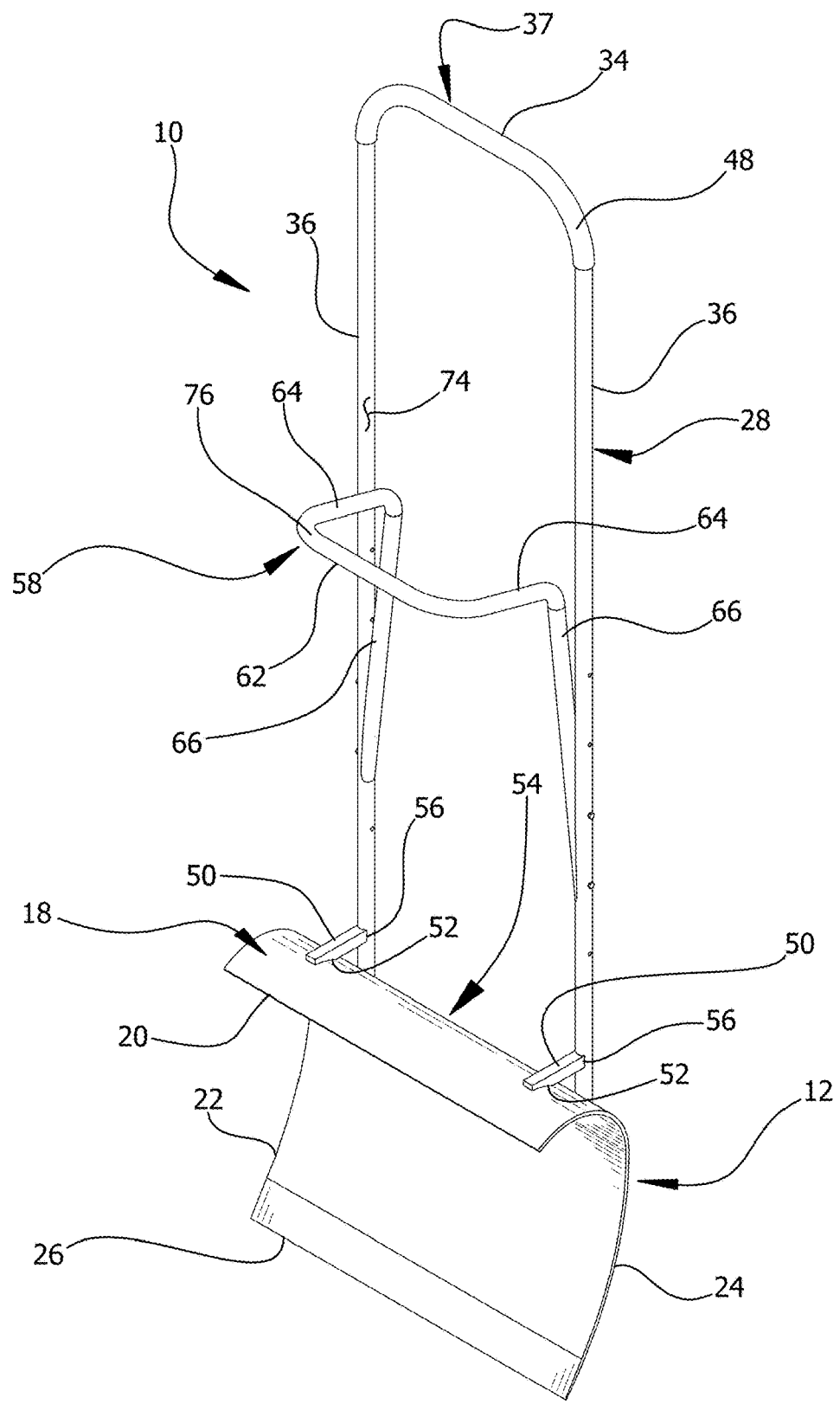
FIG. 1 is a front perspective view of a snow shovel device according to an embodiment of the disclosure.
Figure 2:
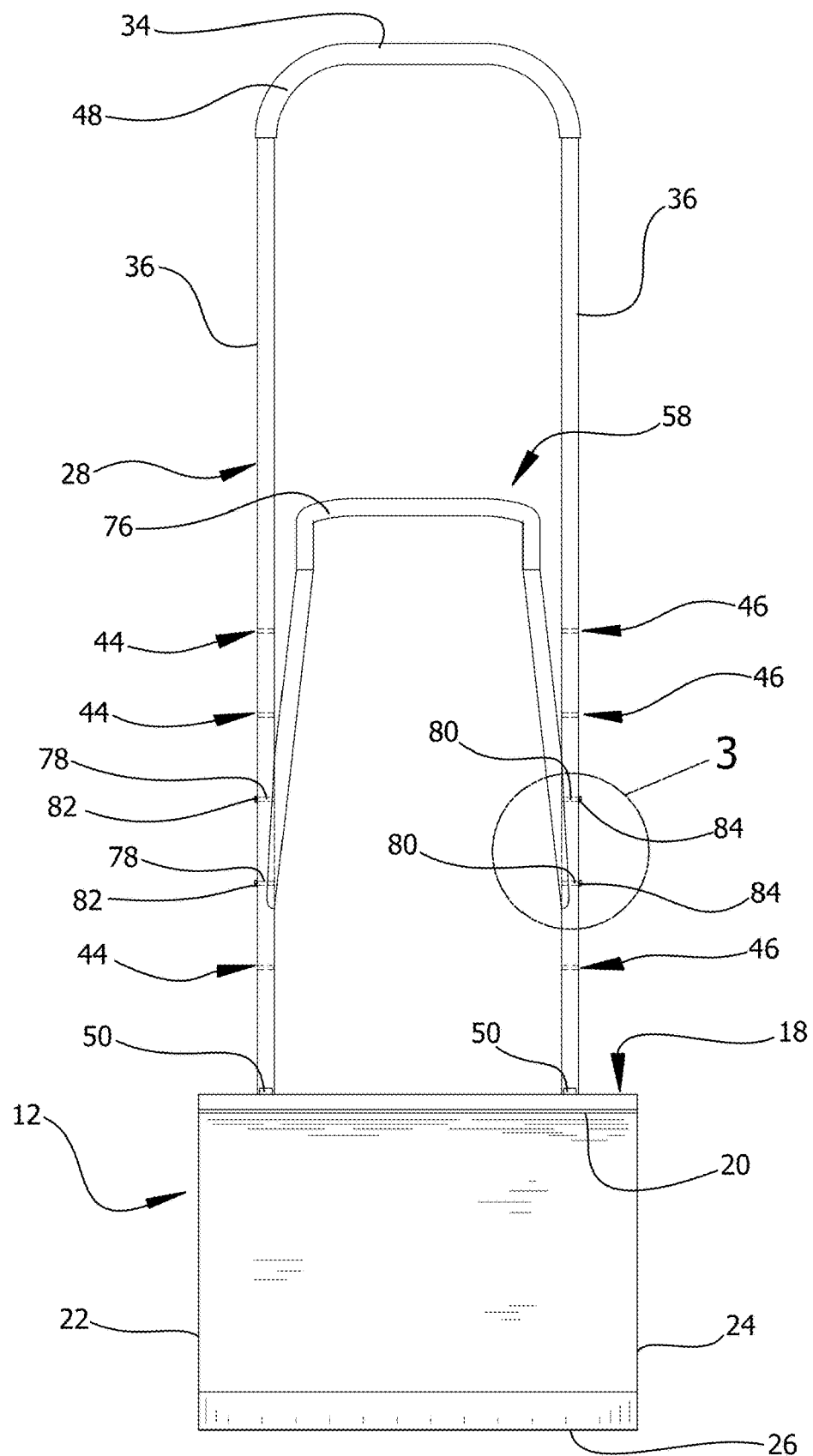
FIG. 2 is a front view of an embodiment of the disclosure.
Figure 3:
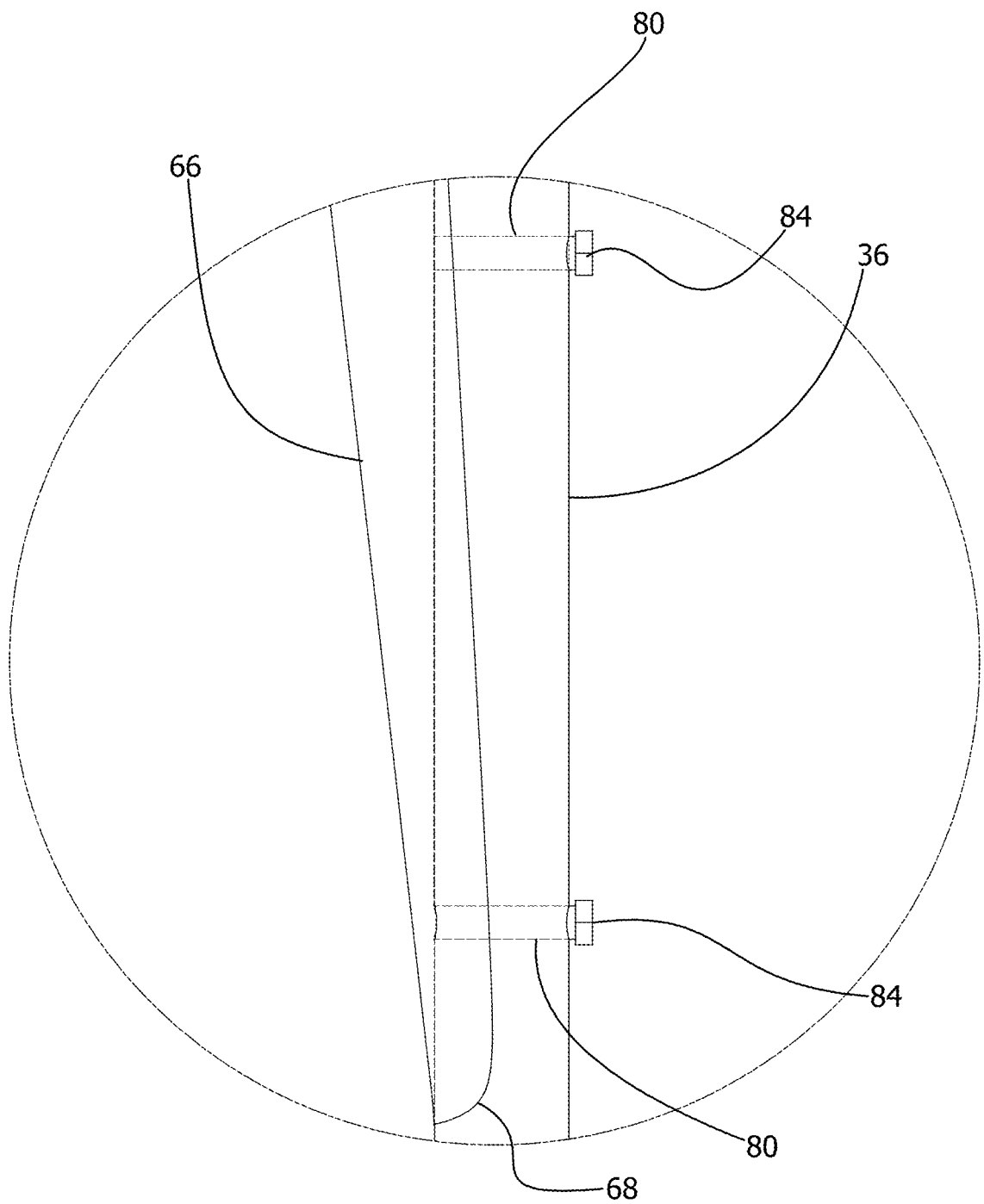
FIG. 3 is a magnified phantom detail view taken from circle 3 of FIG. 2 of an embodiment of the disclosure.
Figure 4:
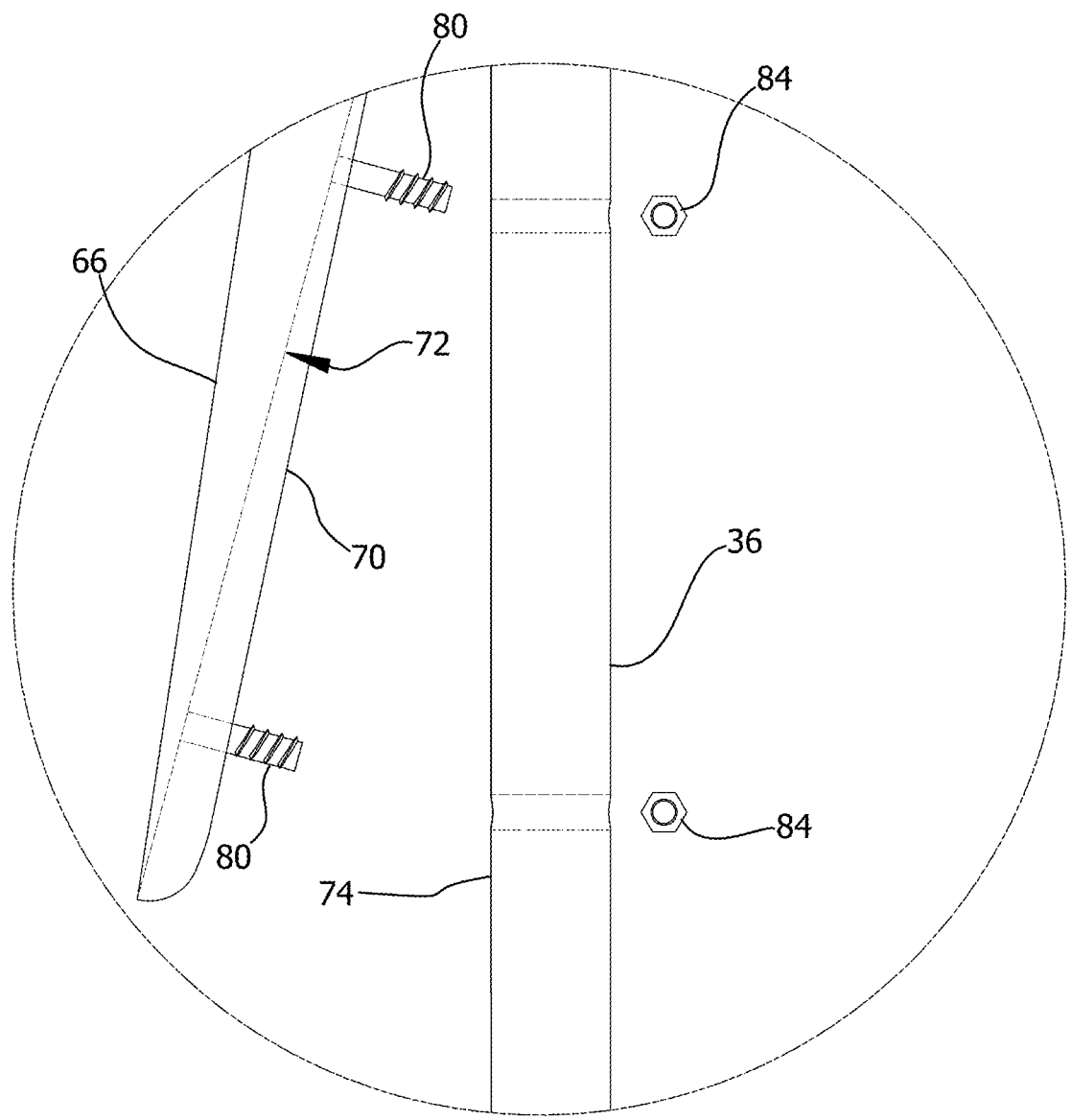
FIG. 4 is an exploded magnified detail view taken from circle 3 of FIG. 2 of an embodiment of the disclosure.
Figure 5:
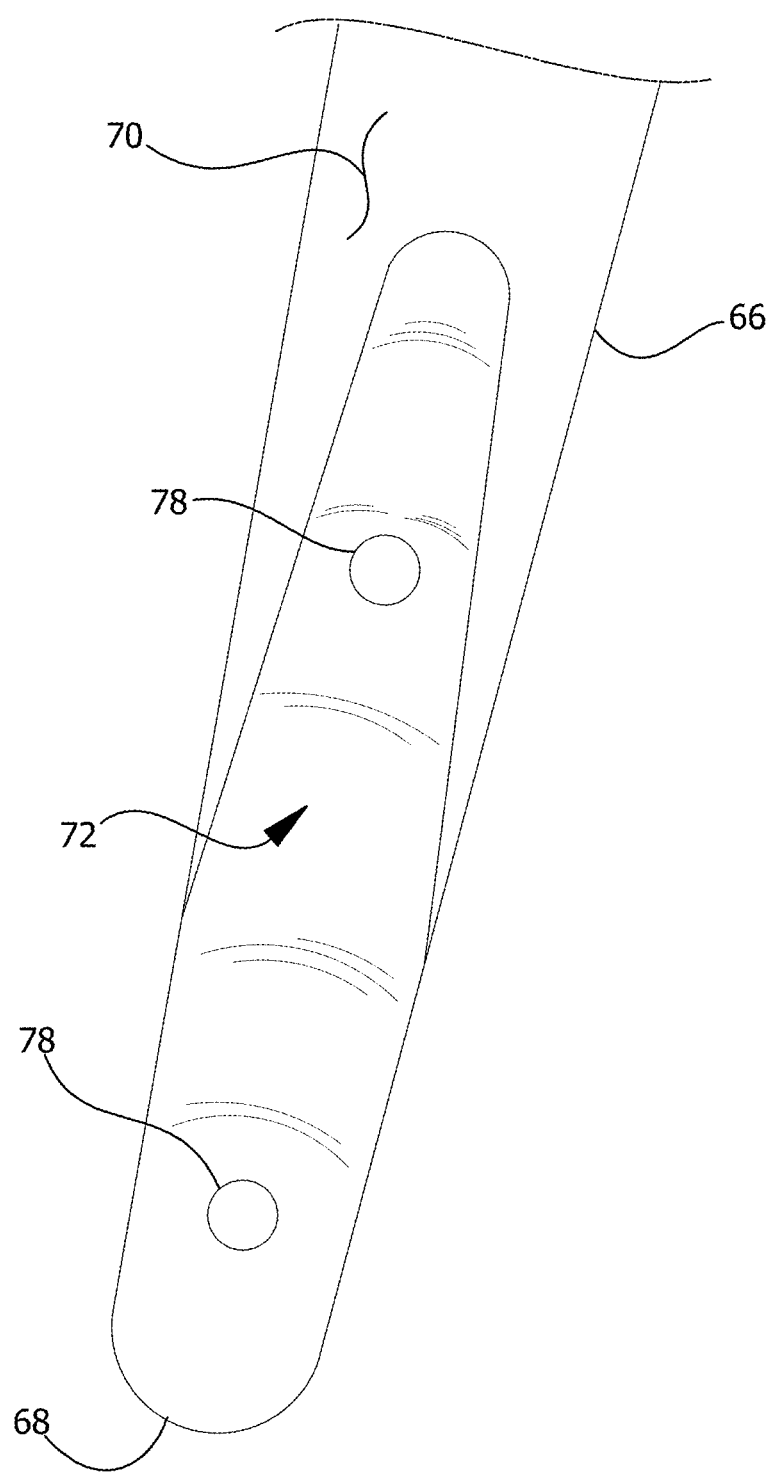
FIG. 5 is a perspective view of a second handle of an embodiment of the disclosure.
Figure 6:
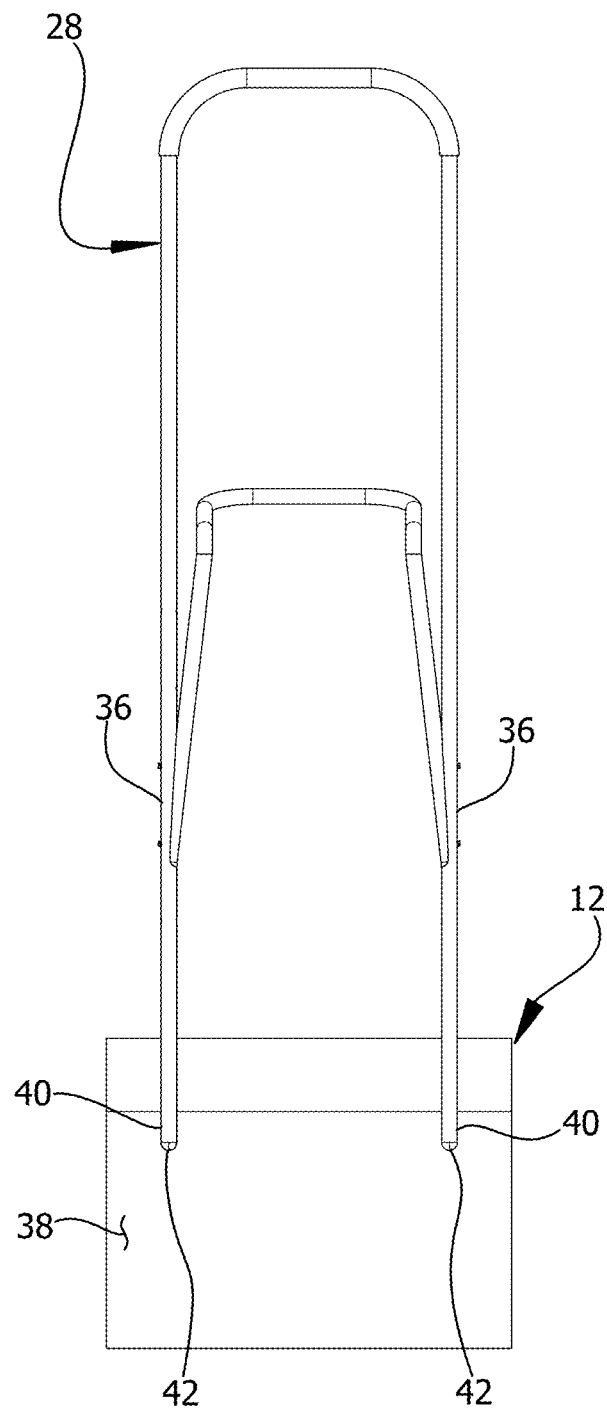
FIG. 6 is a back view of an embodiment to the disclosure.
Figure 7:
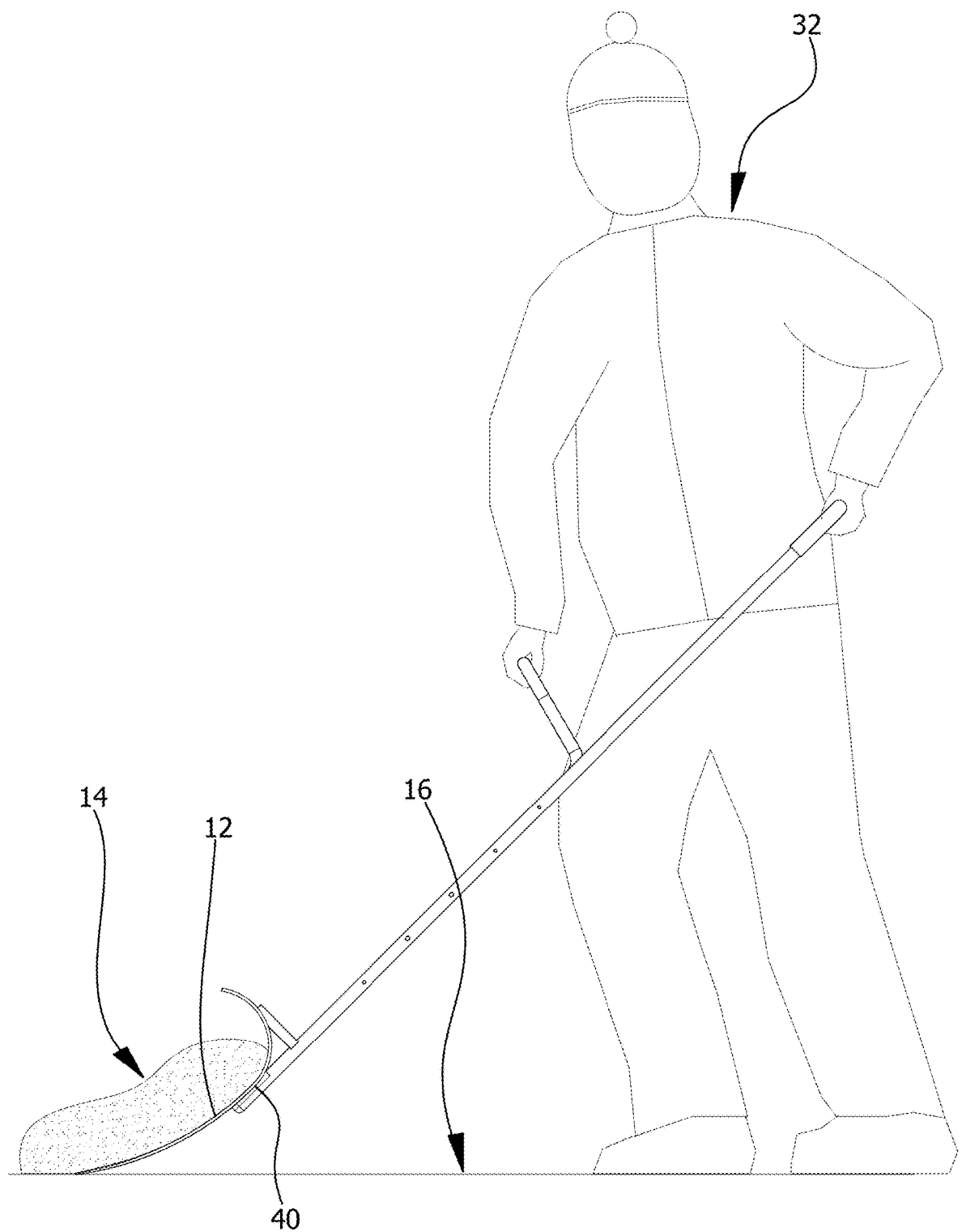
FIG. 7 is a perspective in-use view of an embodiment of the disclosure.

With reference now to the drawings, and in particular to FIGS. 1 through 7 thereof, a new snow shovel device embodying the principles and concepts of an embodiment of the disclosure and generally designated by the reference numeral 10 will be described.

As best illustrated in FIGS. 1 through 6, the snow shovel device 10 generally comprises a shovel blade 12 that is widened along a lateral axis to shovel snow 14 from a support surface 16 which might include a sidewalk or a driveway. The shovel blade 12 has a curl 18 located adjacent to a top end 20 of the shovel blade 12 to inhibit the snow 14 from passing over the shovel blade 12 when the snow 14 is being shoveled. Furthermore, the curl 18 extends between a first lateral edge 22 and a second lateral edge 24 of the shovel blade 12 having the top end 20 being directed downwardly toward a bottom end 26 of the shovel blade 12.

A first handle 28 is attached to and extends upwardly from the shovel blade 12 such that the first handle 28 can be gripped by a user 32 thereby enabling the user 32 to push the shovel blade 12 along the support surface 16 to push the snow 14. The first handle 28 has a central arm 34 extending between and being perpendicular to a pair of outward arms 36 such that the first handle 28 has a U-shape; The central arm 34 defines a grip 37 of the first handle 28 which can be gripped by the user 32. Each of the pair of outward arms 36 is attached to a rear surface 38 of the shovel blade 12 at a connection point 40 located adjacent to a bottom end 42 of each of the pair of outward arms 36. Furthermore, the connection point 40 is located adjacent to a beginning of the curl 18 in the shovel blade 12. Each of the pair of outward arms 36 is spaced inwardly from a respective one of the first lateral edge 22 and the second lateral edge 24 of the shovel blade 12.

The first handle 28 has a plurality of first holes 44 each extending through a respective one of the pair of outward arms 36. The first holes 44 are evenly spaced apart from each other and are distributed along a substantial length of the respective outward arm 36. Additionally, the first holes 44 are positioned closer to the bottom end 42 of the respective outward arm 36 than the central arm 34. The first handle 28 has a plurality of second holes 46 each extending through a respective one of the pair of outward arms 36. The second holes 46 are evenly spaced apart from each other and are distributed along a substantial length of the respective outward arm 36. Additionally, the second holes 46 are positioned closer to the bottom end 42 of the respective outward arm 36 than the central arm 34. Each of the plurality of first holes 44 is aligned with a respective one of the plurality of second holes 46.

A first cushion 48 extends around the central arm 34 of the first handle 28 such that the first cushion 48 can be gripped by the user 32. The first cushion 48 extends downwardly along a partial length of each of the pair of outward arms 36 of the first handle 28. Additionally, the first cushion 48 is comprised of a resiliently compressible material, including but not being limited to rubber or silicone, to enhance comfort for the user 32 when the user 32 grips the first cushion 48.

A pair of ribs 50 is provided and each of the pair of ribs 50 has a lower edge 52. A portion of the lower edge 52 of each of the pair of ribs 50 is attached to the rear surface 38 of the shovel blade 12 at an apex 54 of the curl 18 in the shovel blade 12. Each of the pair of ribs 50 is elongated to extend beyond the rear surface 38 of the shovel blade 12 such that a rear end 56 of each of the pair of ribs 50 is spaced from the rear surface 38. The rear end 56 of each of the pair of ribs 50 is attached to a respective one of the pair of outward arms 36 of the first handle 28 such that each of the pair of ribs 50 retains the first handle 28 at a preferred angle with respect to the shovel blade 12. In this way each of the pair of ribs 50 inhibits the first handle 28 from deflecting from the shovel blade 12 when the user 32 is pushing the snow 14.

A second handle 58 is removably attached to the first handle 28 such that the second handle 58 can be gripped by the user 32. The second handle 58 is positioned closer to the shovel blade 12 than the first handle 28. In this way the second handle 58 enables the user 32 to throw the snow 14 with the shovel blade 12 without requiring the user 32 to bend over. The second handle 58 has a middle arm 62 extending between and being perpendicular to a pair of first sidelong arms 64. The second handle 58 has a pair of second sidelong arms 66 each extending downwardly from a respective one of the pair of first sidelong arms 64 such that the middle arm 62 is spaced forwardly from the pair of second sidelong arms 66. Furthermore, the middle arm 62 lies on a plane that is oriented perpendicular to each of the pair of second sidelong arms 66; the middle arm 62 defines a grip 67 of the second handle 58 which can be gripped by the user 32.

Each of the pair of second sidelong arms 66 angles outwardly from the respective first sidelong arm 64 such that a bottom end 68 of each of the pair of second sidelong arms 66 is spaced outwardly from an intersection between a respective second sidelong arm 66 and the respective first sidelong arm 64. Each of the pair second sidelong arms 66 has an outwardly facing surface 70 and the outwardly facing surface 70 of each of the pair of second sidelong arms 66 has a concave portion 72 which extends from the bottom end 42 toward the respective first sidelong arm 64. The concave portion 72 of the outwardly facing surface 70 of each of the pair of second sidelong arms 66 conforms to curvature of an inwardly facing surface 74 of a respective one of the pair of outward arms 36 of the first handle 28.

A second cushion 76 extends around the middle arm 62 and each of the pair of first sidelong arms 64 of the second handle 58 such that the second cushion 76 can be gripped by the user 32. The second cushion 76 extends downwardly along a partial length of each of the pair of second sidelong arms 66 of the second handle 58. The second cushion 76 is comprised of a resiliently compressible material, including but not being limited to rubber or silicone, to enhance comfort for the user 32.

A pair of first screws 78 is each attached to and extends laterally away from the concave portion 72 of the outwardly facing surface 70 of a respective one of the pair of second sidelong arms 66. Each of the pair of first screws 78 is spaced apart from each other a strategic distance to enable each of the pair of first screws 78 to be extended through a respective one of the plurality of first holes 44 in the in the respective outward arm 36 of the first handle 28. In this way the pair of first screws 78 enables the middle arm 62 of the second handle 58 to be spaced from the central arm 34 of the first handle 28 a distance that enables the user 32 to comfortably grip the middle arm 62 and the central arm 34.

A pair of second screws 80 is each attached to and extends laterally away from the concave portion 72 of the outwardly facing surface 70 of a respective one of the pair of second sidelong arms 66. Each of the pair of second screws 80 is spaced apart from each other a strategic distance to enable each of the pair of second screws 80 to be extended through a respective one of the plurality of second holes 46 in the in the respective outward arm 36 of the second handle 58. In this way the pair of second screws 80 enables the middle arm 62 of the second handle 58 to be spaced from the central arm 34 of the first handle 28 a distance that enables the user 32 to comfortably grip the middle arm 62 and the central arm 34. A pair of first nuts 82 is provided and each of the pair of first nuts 82 is threadably attachable to a respective one of the pair of first screws 78 when the pair of first screws 78 is extended though the respective first holes 44 for securing the second handle 58 to the first handle 28. A pair of second nuts 84 is provided and each of the pair of second nuts 84 is threadably attachable to a respective one of the pair of second screws 80 when the pair of second screws 80 is extended though the respective second holes 46 for securing the second handle 58 to the first handle 28.

In use, the second handle 58 is attached to the first handle 28 at a point determined by the user 32 to ensure the user 32 can comfortably grip the central arm 34 of the first handle 28 and the middle arm 62 of the second handle 58. The shovel blade 12 is pushed along the support surface 16 to push the snow 14 to clear the snow 14 from the support surface 16. The user 32 can employ the second handle 58 to throw the snow 14 off of the support surface 16 without requiring the user 32 to bend over. In this way the first handle 28 and the second handle 58 enable the user 32 to remove the snow 14 from the support surface 16 with less physical exertion than is typically required when using a traditional snow 14 shovel.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A snow shovel device which has a pair of handles for reducing the effort required to throw snow while shoveling the snow, said device comprising:
   a shovel blade being widened along a lateral axis wherein said shovel blade is configured to shovel snow from a support surface, said shovel blade having a curl located adjacent to a top end of said shovel blade wherein said curl is configured to inhibit the snow from passing over said shovel blade when the snow is being shoveled;
   a first handle being attached to and extending upwardly from said shovel blade wherein said first handle is configured to be gripped by a user thereby enabling the user to push said shovel blade along the support surface to push the snow, said first handle comprising perpendicularly oriented members such that said first handle has a U-shape;
   a second handle being removably attached to said first handle said second handle is configured to be gripped by the user, said grip of said second handle being positioned closer to said shovel blade than said grip of said first handle wherein said grip of said second handle is configured to enable the user to throw the snow with said shovel blade without requiring the user to bend over, said second handle comprising perpendicularly oriented members such that said second handle has a U-shape;
   wherein said shovel blade has a rear surface;
   wherein said first handle includes a pair of outward arms;
   wherein said device includes a pair of ribs;
   wherein each of said pair of ribs has a lower edge:
   wherein a portion of said lower edge of each of said pair of ribs is attached to said rear surface of said shovel blade at an apex of said curl in said shovel blade;
   wherein each of said pair of ribs is elongated to extend beyond said rear surface of said shovel blade such that a rear end of each of said pair of ribs is spaced from said rear surface; and
   wherein said rear end of each of said pair of ribs is attached to a respective one of said pair of outward arms of said first handle such that each of said pair of ribs retains said first handle at a preferred angle with respect to said shovel blade wherein each of said pair of ribs is configured to inhibit said first handle from deflecting from said shovel blade when the user is pushing the snow.

2. The snow shovel device according to claim 1, wherein:
   said first handle has a central arm extending between and being perpendicular to a pair of outward arms such that said first handle has said U-shape having said central arm defining a grip of said first handle wherein said grip is configured to be gripped by the user;
   each of said pair of outward arms is attached to a rear surface of said shovel blade at a connection point located adjacent to a bottom end of each of said pair of outward arms;
   said connection point is located adjacent to a beginning of said curl in said shovel blade;
   each of said pair of outward arms is spaced inwardly from a respective one of said first lateral edge and said second lateral edge of said shovel blade;
   said first handle has a plurality of first holes each extending through a respective one of said pair of outward arms;
   said first holes are evenly spaced apart from each other and are distributed along a substantial length of said respective outward arm;
   said plurality of first holes is positioned closer to said bottom end of said respective outward arm than said central arm;
   said first handle has a plurality of second holes each extending through a respective one of said pair of outward arms;
   said second holes are evenly spaced apart from each other and are distributed along a substantial length of said respective outward arm, said plurality of second holes being positioned closer to said bottom end of said respective outward arm than said central arm; and
   each of said plurality of first holes is aligned with a respective one of said plurality of second holes.

3. The snow shovel device according to claim 2, wherein:
   said device includes a first cushion extending around said central arm of said first handle wherein said first cushion is configured to be gripped by the user;
   said first cushion extends downwardly along a partial length of each of said pair of outward arms of said first handle; and
   said first cushion is comprised of a resiliently compressible material wherein said first cushion is configured to enhance comfort for the user when the user grips said first cushion.

4. The snow shovel device according to claim 1, wherein:
   said first handle includes a pair of outward arms;
   said first handle includes a plurality of first holes each extending through a respective one of said pair of outward arms;
   said first handle includes a plurality of second holes each extending through a respective one of said pair of outward arms;
   said second handle includes a pair of first sidelong arms and a pair of second sidelong arms;
   each of said pair second sidelong arms has an outwardly facing surface and a bottom end;
   said outwardly facing surface of each of said pair of second sidelong arms has a concave portion which extends from said bottom end toward a respective first sidelong arm thereby enabling said concave portion of said outwardly facing surface of each of said pair of second sidelong arms to conform to curvature of an inwardly facing surface of a respective one of said pair of outward arms of said first handle;
   said device includes a pair of first screws;
   said device includes a pair of second screws:
   each of said pair of second screws is attached to and extends laterally away from said concave portion of said outwardly facing surface of a respective one of said pair of second sidelong arms;
   each of said pair of second screws is spaced apart from each other a strategic distance to enable each of said pair of second screws to be extended through a respective one of said plurality of second holes in said in said respective outward arm of said second handle wherein said pair of second screws is configured to enable said middle arm of said second handle to be spaced from said central arm of said first handle a distance that enables the user to comfortably grip said middle arm and said central arm;
   said device includes a pair of first nuts;

said device includes a pair of second nuts; and
each of said pair of second nuts is threadably attachable to a respective one of said pair of second screws when said pair of second screws is extended though said respective second holes for securing said second handle to said first handle.

5. The snow shovel device according to claim 1, further comprising:
said curl extending between a first lateral edge and a second lateral edge of said shovel blade having said top end being directed downwardly toward a bottom end of said shovel blade;
said first handle having a central arm extending between and being perpendicular to said pair of outward arms such that said first handle has a U-shape having said central arm defining a grip of said first handle wherein said grip is configured to be gripped by the user, each of said pair of outward arms being attached to said rear surface of said shovel blade at a connection point located adjacent to a bottom end of each of said pair of outward arms, said connection point being located adjacent to a beginning of said curl in said shovel blade, each of said pair of outward arms being spaced inwardly from a respective one of said first lateral edge and said second lateral edge of said shovel blade, said first handle having a plurality of first holes each extending through a respective one of said pair of outward arms, said first holes being evenly spaced apart from each other and being distributed along a substantial length of said respective outward arm, said plurality of first holes being positioned closer to said bottom end of said respective outward arm than said central arm, said first handle having a plurality of second holes each extending through a respective one of said pair of outward arms, said second holes being evenly spaced apart from each other and being distributed along a substantial length of said respective outward arm, said plurality of second holes being positioned closer to said bottom end of said respective outward arm than said central arm, each of said plurality of first holes being aligned with a respective one of said plurality of second holes;
a first cushion extending around said central arm of said first handle wherein said first cushion is configured to be gripped by the user, said first cushion extending downwardly along a partial length of each of said pair of outward arms of said first handle, said first cushion being comprised of a resiliently compressible material wherein said first cushion is configured to enhance comfort for the user when the user grips said first cushion;
said second handle being positioned closer to said shovel blade than said first handle wherein said second handle is configured to enable the user to throw the snow with said shovel blade without requiring the user to bend over, said second handle having a middle arm extending between and being perpendicular to a pair of first sidelong arms, said second handle having a pair of second sidelong arms each extending downwardly from a respective one of said pair of first sidelong arms such that said middle arm is spaced forwardly from said pair of second sidelong arms having said middle arm lying on a plane being oriented perpendicular to each of said pair of second sidelong arms, said middle arm defining a grip of said second handle wherein said grip of said second handle is configured to be gripped by the user, each of said pair of second sidelong arms angling outwardly from said respective first sidelong arm such that a bottom end of each of said pair of second sidelong arms is spaced outwardly from an intersection between a respective second sidelong arm and said respective first sidelong arm, each of said pair second sidelong arms having an outwardly facing surface, said outwardly facing surface of each of said pair of second sidelong arms having a concave portion which extends from said bottom end toward said respective first sidelong arm thereby enabling said concave portion of said outwardly facing surface of each of said pair of second sidelong arms to conform to curvature of an inwardly facing surface of a respective one of said pair of outward arms of said first handle;
a second cushion extending around said middle arm and each of said pair of first sidelong arms of said second handle wherein said second cushion is configured to be gripped by the user, said second cushion extending downwardly along a partial length of each of said pair of second sidelong arms of said second handle, said second cushion being comprised of a resiliently compressible material wherein said second cushion is configured to enhance comfort for the user;
a pair of first screws, each of said pair of first screws being attached to and extending laterally away from said concave portion of said outwardly facing surface of a respective one of said pair of second sidelong arms, each of said pair of first screws being spaced apart from each other a strategic distance to enable each of said pair of first screws to be extended through a respective one of said plurality of first holes in said in said respective outward arm of said first handle wherein said pair of first screws is configured to enable said middle arm of said second handle to be spaced from said central arm of said first handle a distance that enables the user to comfortably grip said middle arm and said central arm;
a pair of second screws, each of said pair of second screws being attached to and extending laterally away from said concave portion of said outwardly facing surface of a respective one of said pair of second sidelong arms, each of said pair of second screws being spaced apart from each other a strategic distance to enable each of said pair of second screws to be extended through a respective one of said plurality of second holes in said in said respective outward arm of said second handle wherein said pair of second screws is configured to enable said middle arm of said second handle to be spaced from said central arm of said first handle a distance that enables the user to comfortably grip said middle arm and said central arm;
a pair of first nuts, each of said pair of first nuts being threadably attachable to a respective one of said pair of first screws when said pair of first screws is extended though said respective first holes for securing said second handle to said first handle; and
a pair of second nuts, each of said pair of second nuts being threadably attachable to a respective one of said pair of second screws when said pair of second screws is extended though said respective second holes for securing said second handle to said first handle.

6. A snow shovel device which has a pair of handles for reducing the effort required to throw snow while shoveling the snow, said device comprising:
a shovel blade being widened along a lateral axis wherein said shovel blade is configured to shovel snow from a support surface, said shovel blade having a curl located adjacent to a top end of said shovel blade wherein said curl is configured to inhibit the snow from passing over said shovel blade when the snow is being shoveled;

a first handle being attached to and extending upwardly from said shovel blade wherein said first handle is configured to be gripped by a user thereby enabling the user to push said shovel blade along the support surface to push the snow, said first handle comprising perpendicularly oriented members such that said first handle has a U-shape;

a second handle being removably attached to said first handle said second handle is configured to be gripped b the user, said grip of said second handle being positioned closer to said shovel blade than said grip of said first handle wherein said grip of said second handle is configured to enable the user to throw the snow with said shovel blade without requiring the user to bend over, said second handle comprising perpendicularly oriented members such that said second handle has a U-shape;

wherein said first handle has a pair of outward arms;

wherein said second handle has a middle arm extending between and being perpendicular to a pair of first sidelong arms;

wherein said second handle includes a pair of second sidelong arms each extending downwardly from a respective one of said pair of first sidelong arms such that said middle arm is spaced forwardly from said pair of second sidelong arms having said middle arm lying on a plane being oriented perpendicular to each of said pair of second sidelong arms;

wherein said middle arm defines a grip of said second handle wherein said grip of said second handle is configured to be gripped by the user;

wherein each of said pair of second sidelong arms angles outwardly from said respective first sidelong arm such that a bottom end of each of said pair of second sidelong arms is spaced outwardly from an intersection between a respective second sidelong arm and said respective first sidelong arm;

wherein each of said pair second sidelong arms has an outwardly facing surface; and wherein said outwardly facing surface of each of said pair of second sidelong arms has a concave portion which extends from said bottom end toward said respective first sidelong arm thereby enabling said concave portion of said outwardly facing surface of each of said pair of second sidelong arms to conform to curvature of an inwardly facing surface of a respective one of said pair of outward arms of said first handle.

7. The snow shovel device according to claim 6, wherein:

said device includes a second cushion extending around said middle arm and each of said pair of first sidelong arms of said second handle wherein said second cushion is configured to be gripped by the user;

said second cushion extends downwardly along a partial length of each of said pair of second sidelong arms of said second handle; and said second cushion is comprised of a resiliently compressible material wherein said second cushion is configured to enhance comfort for the user.

8. A snow shovel device which has a pair of handles for reducing the effort required to throw snow while shoveling the snow, said device comprising:

a shovel blade being widened along a lateral axis wherein said shovel blade is configured to shovel snow from a support surface, said shovel blade having a curl located adjacent to a top end of said shovel blade wherein said curl is configured to inhibit the snow from passing over said shovel blade when the snow is being shoveled;

a first handle being attached to and extending upwardly from said shovel blade wherein said first handle is configured to be gripped by a user thereby enabling the user to push said shovel blade along the support surface to push the snow, said first handle comprising perpendicularly oriented members such that said first handle has a U-shape;

a second handle being removably attached to said first handle said second handle is configured to be gripped by the user, said grip of said second handle being positioned closer to said shovel blade than said grip of said first handle wherein said grip of said second handle is configured to enable the user to throw the snow with said shovel blade without requiring the user to bend over, said second handle comprising perpendicularly oriented members such that said second handle has a U-shape;

wherein said first handle includes a pair of outward arms;

wherein said first handle includes a plurality of first holes each extending through a respective one of said pair of outward arms;

wherein said second handle includes a pair of first sidelong arms and a pair of second sidelong arms;

wherein each of said pair second sidelong arms has an outwardly facing surface;

wherein said outwardly facing surface of each of said pair of second sidelong arms has a concave portion which extends from said bottom end toward a respective first sidelong arm thereby enabling said concave portion of said outwardly facing surface of each of said pair of second sidelong arms to conform to curvature of an inwardly facing surface of a respective one of said pair of outward arms of said first handle;

wherein said device includes a pair of first screws;

wherein each of said pair of first screws is attached to and extends laterally away from said concave portion of said outwardly facing surface of a respective one of said pair of second sidelong arms;

wherein each of said pair of first screws is spaced apart from each other a strategic distance to enable each of said pair of first screws to be extended through a respective one of said plurality of first holes in said in said respective outward arm of said first handle wherein said pair of first screws is configured to enable said middle arm of said second handle to be spaced from said central arm of said first handle a distance that enables the user to comfortably grip said middle arm and said central arm;

wherein said device includes a pair of first nuts; and wherein each of said pair of first nuts is threadably attachable to a respective one of said pair of first screws when said pair of first screws is extended though said respective first holes for securing said second handle to said first handle.

* * * * *